United States Patent [19]

Tomlinson

[11] Patent Number: 5,577,377
[45] Date of Patent: Nov. 26, 1996

[54] COMBINED CYCLE WITH STEAM COOLED GAS TURBINE

[75] Inventor: Leroy O. Tomlinson, Schenectady, N.Y.

[73] Assignee: General Electric Co., Schenectady, N.Y.

[21] Appl. No.: 442,583

[22] Filed: May 16, 1995

Related U.S. Application Data

[63] Continuation-in-part of Ser. No. 417,426, Apr. 5, 1995, which is a continuation-in-part of Ser. No. 161,070, Dec. 3, 1993, Pat. No. 5,428,950, which is a continuation-in-part of Ser. No. 145,633, Nov. 4, 1993, Pat. No. 5,412,937.

[51] Int. Cl.$^6$ ..................................................... F02C 6/18
[52] U.S. Cl. ........................... 60/39.02; 60/39.182
[58] Field of Search ........................... 60/39.02, 39.182, 60/39.83; 122/7 R

[56] References Cited

U.S. PATENT DOCUMENTS

| | | |
|---|---|---|
| 1,901,873 | 3/1893 | Holzwarth . |
| 3,691,760 | 9/1972 | Vidal et al. . |
| 3,879,616 | 4/1975 | Baker et al. . |
| 4,424,668 | 1/1984 | Mukherjee .................. 60/39.182 |
| 4,519,207 | 5/1985 | Okabe et al. . |
| 4,576,124 | 3/1986 | Martens et al. . |
| 5,042,247 | 8/1991 | Moore . |
| 5,199,256 | 4/1993 | Moore . |
| 5,253,976 | 10/1993 | Cunha . |
| 5,412,937 | 5/1995 | Tomlinson et al. ........... 60/39.182 |
| 5,428,950 | 7/1995 | Tomlinson et al. ........... 60/39.182 |
| 5,471,832 | 12/1995 | Sugita et al. ................. 60/39.182 |

FOREIGN PATENT DOCUMENTS

| | | |
|---|---|---|
| 0363979 | 4/1988 | European Pat. Off. . |
| 0379930 | 8/1990 | European Pat. Off. . |
| 1355952 | 6/1974 | United Kingdom . |
| 1408174 | 10/1975 | United Kingdom . |

OTHER PUBLICATIONS

"GE Combined–Cycle Product Line and Performance", Chase et al, GE Power Generation, 38th GE Turbine State–of–the–Art Technology Seminar, Aug. 1994.
"GE Combined–Cycle Experience", Maslak et al., GE Power Generation, 38th GE Turbine State–of–the–Art Technology Seminar, Aug. 1994.
"Single–Shaft Combined–Cycle Power Generation System", Tomlinson et al. GE Power Generation, 38th Turbine State–of–the–Art Technology Seminar, Aug. 1994.

*Primary Examiner*—Louis J. Casaregola
*Attorney, Agent, or Firm*—Nixon & Vanderhye

[57] ABSTRACT

In a method of operating a combined cycle system including a gas turbine, a steam turbine and a multi-pressure heat recovery steam generator, an improvement includes supplying gas turbine cooling duty steam from a high pressure section of the steam turbine and from an intermediate pressure evaporator in the multi-pressure heat recovery steam generator, conducting the gas turbine cooling duty steam to the gas turbine for cooling hot gas turbine parts, and then returning the gas turbine cooling duty steam to an intermediate pressure section of the steam turbine. In a start-up procedure, steam is extracted from a first pass of a high pressure superheater in the multi-pressure heat recovery steam generator, mixed with steam discharged from the high pressure superheater and then supplied to the gas turbine cooling duty system. In this same start-up procedure, the gas turbine cooling duty steam is returned to the system condenser, bypassing the intermediate pressure section of the steam turbine. Related apparatus is also disclosed.

12 Claims, 3 Drawing Sheets

COMBINED CYCLE WITH STEAM COOLED GAS TURBINE

RELATED APPLICATIONS

This application is a continuation-in-part of application Ser. No. 08/417,426 filed Apr. 5, 1995 which is a continuation-in-part of application Ser. No. 08/161,070 filed Dec. 3, 1993 (U.S. Pat. No. 5,428,950) which in turn, is a continuation-in-part of application Ser. No. 08/145,633 filed Nov. 4, 1993 (U.S. Pat. No. 5,412,937).

TECHNICAL FIELD

This invention relates to a combined cycle power generation system in which exhaust gases from a gas turbine are recovered in an unfired, multi-pressure, heat recovery steam generator, and in which steam from the steam turbine exhaust and from the heat recovery steam generator intermediate pressure evaporator is utilized to cool the gas turbine stage 1 and 2 nozzles and buckets.

BACKGROUND PRIOR ART

In typical combined cycle power generation systems, cooling of gas turbine high temperature components and the accompanying steam cycle are usually of the following types:

(1) Air Cooled Gas Turbine—The gas turbine high temperature components are cooled by air extracted or conducted from other components in the cycle. The steam cycle and the gas turbine coolant streams are not integrated.

(2) Water Cooled Gas Turbine—The gas turbine high temperature components are cooled with water in the liquid phase. The heat extracted from the high temperature gas turbine components is integrated with the combined cycle steam bottoming cycle. The energy extracted from the high temperature section of the gas turbine is transported to the low temperature portion of the steam cycle to maintain the water in the liquid phase, thus compromising thermal efficiency of the cycle.

(3) Steam Cooled Gas Turbine Integrated Into a Combined Cycle with Multiple Pressure—This cycle uses steam from the low pressure section of a multiple pressure combined cycle to cool the high temperature components of the gas turbine with energy extracted from the gas turbine returned to the low pressure section of the steam cycle. This system is described in U.S. Pat. No. 4,424,668. The thermal efficiency that can be achieved by this system is inferior to that achievable with this invention, however, because, in the '668 system, energy is transported from the high temperature part of the cycle to a low temperature section of the cycle for conversion of the heat energy to power.

DISCLOSURE OF THE INVENTION

The present invention integrates advanced technology relating to closed circuit steam cooled 60 Hz and 50 Hz gas turbines as well as advanced technology steam turbines, along with reliable steam cycles using unfired, multi-pressure, reheat, heat recovery steam generators (HRSGs). In a preferred arrangement, the gas turbine section of the combined cycle system includes generally a compressor, a combustion system and a gas turbine. The steam turbine system includes generally a steam turbine and a condenser, and the steam turbine drives a generator which in turn produces electrical power. In the preferred arrangement, the gas turbine and steam turbine are coupled to the generator in tandem on a single shaft.

The gas turbine cooling system in accordance with this continuation-in-part application is integrated into the steam turbine system in that steam is supplied from the high pressure (HP) steam turbine exhaust and the HRSG intermediate pressure (IP) evaporator to the closed circuit system that cools the gas turbine stage 1 and 2 nozzles and buckets. The cooling steam is returned to the steam cycle in the hot reheat line. Thus, the cooling system operates in parallel with the HRSG reheater.

More specifically, the supply of cooling steam from the exhaust of the HP steam turbine and the HRSG intermediate pressure evaporator drum is delivered to the gas turbine stationary parts through casing connections and to the rotor through a conventional gland with labyrinth seals and appropriate leak-offs. The cooling steam is returned to the steam cycle at the hot reheat line, from which it is admitted to the IP steam turbine.

A start-up steam supply system is also included which extracts steam from the HP superheater after the first pass and mixes it with steam from the superheater discharge to supply steam to the cooling system at the required temperature. The steam from the IP drum is also used. When the gas turbine is operating with a start-up steam supply, the cooling steam is not admitted to the IP turbine, but instead is bypassed to the condenser through the IP bypass valve and attemperator. The IP bypass valve is modulated to maintain the pressure of the cooling steam above the gas turbine compressor discharge pressure to prevent gas leakage into the cooling steam, and hence the steam cycle.

During gas turbine start-up, acceleration to rated speed and operation at low load, the gas turbine is cooled by air extracted from the compressor discharge. The air is filtered prior to supply to the gas turbine cooling system. Cooling air from the gas turbine cooling system is discharged to the gas turbine exhaust. Appropriate shut-off valves isolate the cooling system from the steam cycle while it is operating with air cooling.

A bypass is provided in the cooling steam circuit immediately upstream of the steam shut-off valves. This bypass allows steam from the starting steam supply to pass through the steam lines and to be discharged to the condenser through the IP bypass valve which warms the steam lines and stabilizes the steam system during starting prior to admitting steam to the cooling system. The cooling steam shut-off valves are hydraulically actuated and included in the trip circuit such that the system is transferred to air cooling immediately upon a normal or emergency shut-down to purge steam from the cooling system.

While the system can be configured with either forced or natural circulation evaporators, natural circulation evaporators are preferred. The HRSG in the embodiment described herein is a typical three pressure, reheat HRSG that is commonly applied in combined cycles. It includes the following features to accommodate the steam cooling system as described herein.

1. The reheater size is reduced since pan of the reheating is performed by the gas turbine cooling system.

2. The reheater is located in the gas path downstream of the high temperature section of the HP superheater. Sufficient heat is transferred to the high temperature superheater to reduce the gas temperature entering the reheater such that the reheater can operate without steam flow if all of the reheat steam is diverted to the gas turbine cooling system during a transient or other unusual operating condition.

3. Control of the HP steam temperature is accomplished by the steam attemperation system which bypasses a section of the HP superheater. This system eliminates the potential for contaminants to enter the steam as can occur with attemperation with feed water. Attemperation steam is extracted after it passes through one pass in the superheater to assure that it will be dry after the small pressure drop across the steam control valve. Once the gas turbine cooling system is operating in its normal mode, with cooling steam supply from the IP evaporator and HP steam turbine exhaust, all of the HP steam passes through the high temperature section of the superheater to limit the temperature of the gas entering the reheater.

4. Provisions for extracting steam for the start-up cooling system supply from the HP superheater downstream of the first pass.

Supply of high purity steam to the gas turbine cooling system is a key feature of the invention. Features included in the system to accomplish this objective are:

1. All cooling steam is purified by evaporation in a steam drum.

2. HP steam temperature is controlled by steam attemperation.

3. Full flow filtration and demineralization of feed water.

4. Inserting all piping in the HP and cooling steam system during standby periods to prevent corrosion. This system is an extension of the nitrogen blanketing system normally included for an HRSG.

5. Application of non-corrosive materials in piping, filters and equipment downstream of the cooling steam shut-off valves.

6. Full flow steam filtration.

In its broader aspects, the present invention thus relates to a method of operating a combined cycle system including a gas turbine, a steam turbine and a multi-pressure heat recovery steam generator, the improvement comprising a) supplying gas turbine cooling duty steam from a high pressure section of the steam turbine and from an intermediate pressure evaporator in the multi-pressure heat recovery steam generator; b) conducting the gas turbine cooling duty steam to the gas turbine for cooling hot gas turbine pans, and c) returning the gas turbine cooling duty steam to an intermediate pressure section of the steam turbine.

In another aspect, the invention relates to a combined cycle system including a gas turbine, a steam turbine and a multi-pressure heat recovery steam generator, the improvement comprising means for supplying gas turbine cooling duty steam from a high pressure section of the steam turbine and from an intermediate pressure evaporator in the multi-pressure heat recovery steam generator and means for conducting the gas turbine cooling duty steam to the gas turbine for cooling hot gas turbine pans, and means for returning the gas turbine cooling duty steam to an intermediate pressure section of the steam turbine.

In still another aspect, the invention relates to a combined cycle system including a gas turbine, a steam turbine and a multi-pressure heat recovery steam generator, wherein the improvement comprises a) a means of cooling the gas turbine hot gas path pans (stationary and rotating) during start-up, low loads, and after a unit trip, using compressor discharge air; b) a means of transferring to and from air cooling to start-up steam cooling which employs a mixture of HP superheater discharge steam, HP superheater bleed steam, and IP evaporator steam to prewarm the steam supply lines and cool the gas turbine hot gas path pans prior to the eventual availability of: c) normal mode cooling steam supply from the IP evaporator and HP turbine exhaust as well as; d) a means of transferring from start-up cooling steam supply to normal mode cooling steam supply and; e) a means of returning the start-up cooling steam to the condenser and the normal mode cooling steam to an intermediate pressure section of the steam turbine.

Additional objects and advantages of the present invention will become apparent from the detailed description as follows.

BEST MODE FOR CARRYING OUT THE INVENTION

Figure 1:
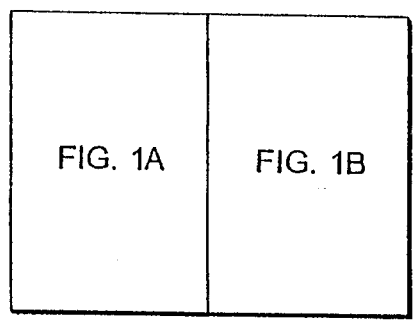
FIG. 1 is a schematic showing the manner of separation of FIGS. 1A and 1B.
Figure 1A:
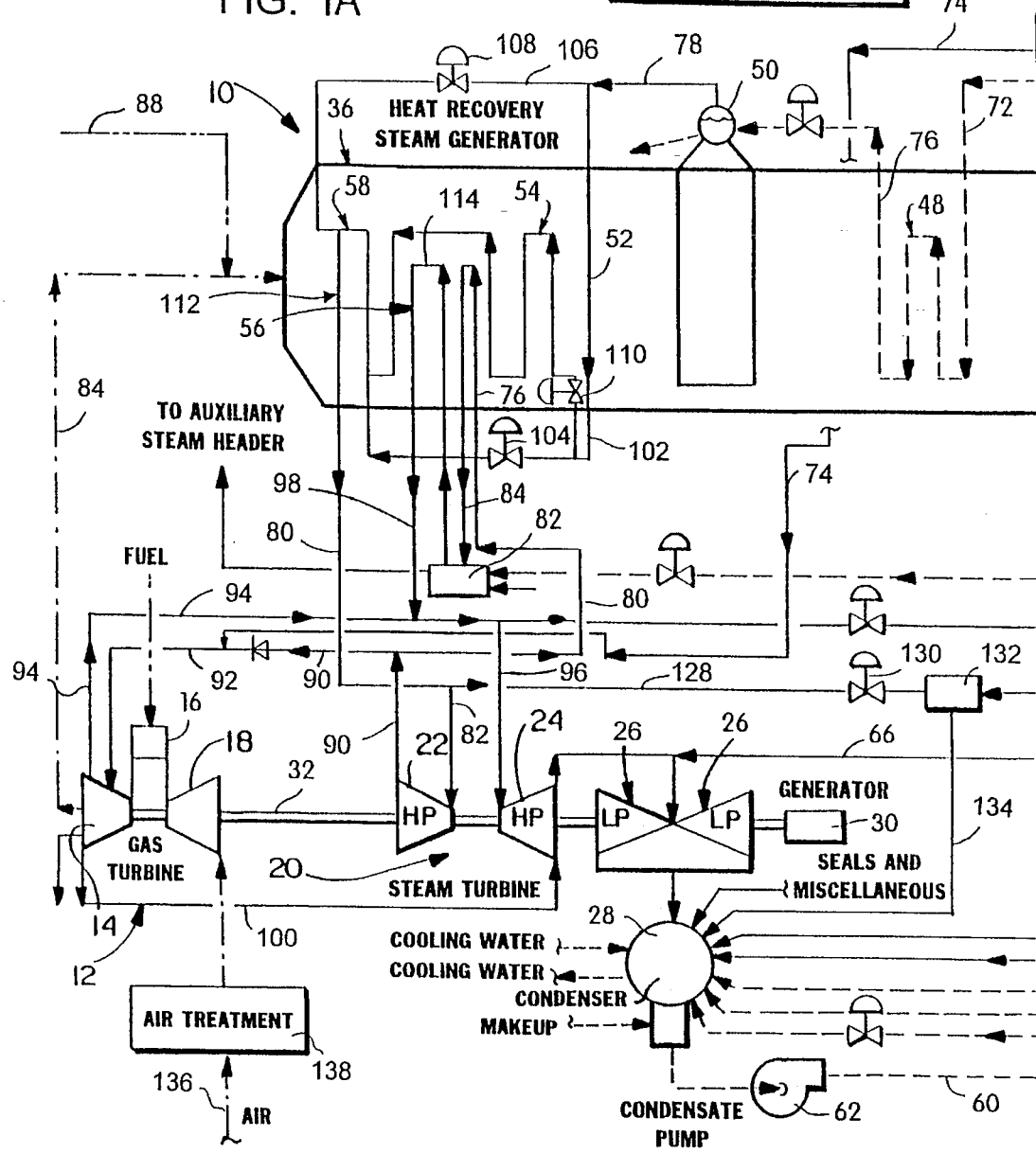
FIGS. 1A and 1B together comprise a schematic flow diagram for a multi-pressure reheat combined cycle system with a steam cooled gas turbine in accordance with this continuation-in-part application.
Figure 1B:
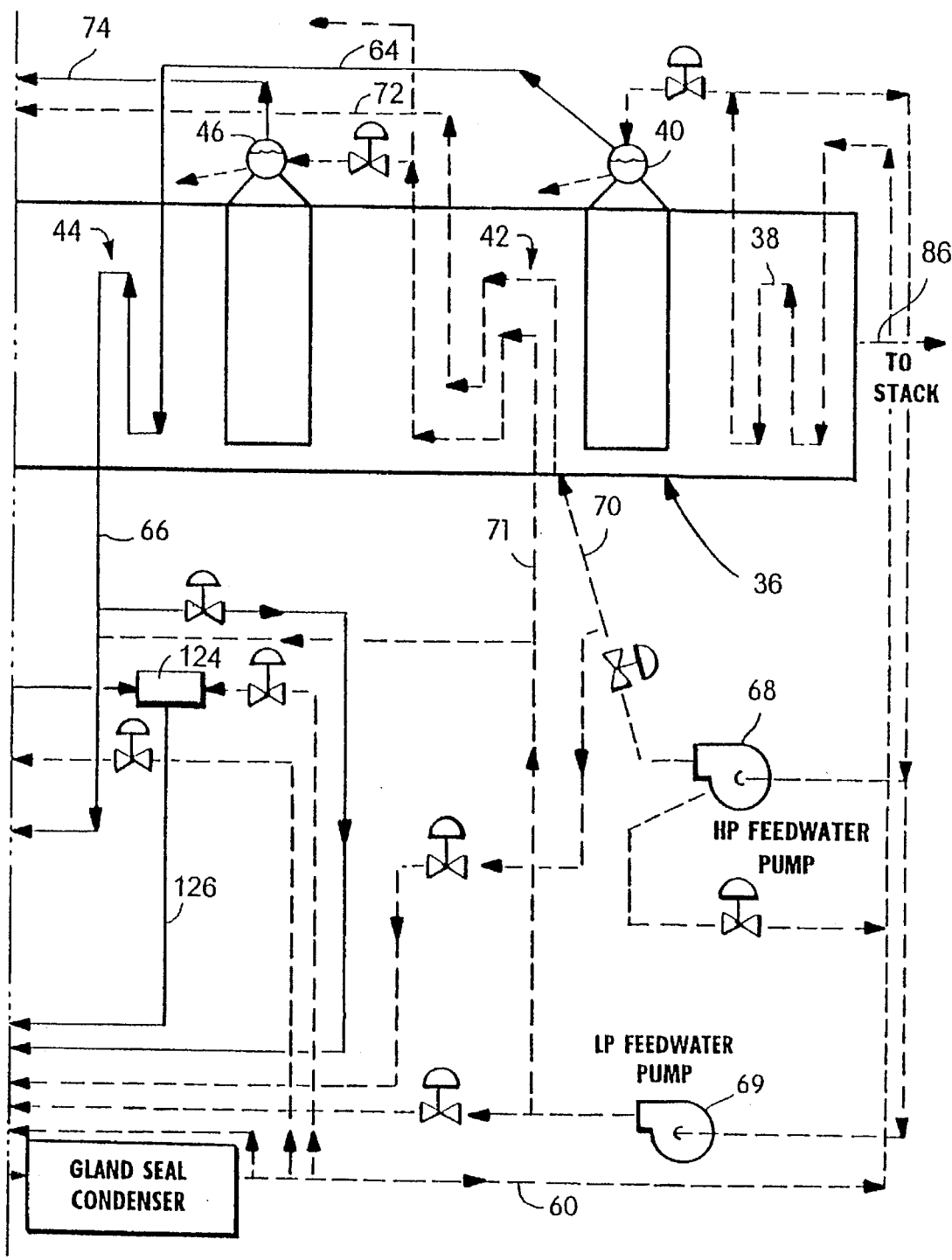

With reference to FIGS. 1A and 1B, the invention is incorporated in a multi-pressure reheat combined cycle power generation system 10. In the preferred embodiment, there is included a gas turbine system 12 comprising a compressor 18, a combustion system 16 and a gas turbine 14. A steam turbine system 20 includes a high pressure section 22, an intermediate pressure section 24 and one or more low pressure sections 26 with multiple steam admission points at different pressures. The low pressure section 26 exhausts to a condenser 28. The steam turbine drives the generator 30 which produces electrical power. The gas turbine 12, steam turbine 20 and generator 30 are arranged in tandem on a single shaft 32.

The combined cycle system as described herein includes a multi-pressure HRSG 36 which includes a low pressure (LP) economizer 38, an LP evaporator 40, an HP and IP economizer 42, a low pressure superheater 44, an IP evaporator 46, an HP economizer 48, an HP evaporator 50, a first HP superheater section 52, at least one intermediate HP superheater section 54, an IP reheater 56 and a final HP superheater section 58 all arranged substantially as disclosed in parent application Ser. No. 08/161,070.

Condensate is fed from condenser 28 to the HRSG 36 via conduit 60 with the aid of pump 62. The condensate subsequently passes through the LP economizer 38 and into the LP evaporator 40. Steam from the low pressure evaporator 40 is fed to the LP superheater 44 via conduit 64 and is then returned to the low pressure section 26 of the steam turbine 20 via conduit 66 and appropriate LP admission stop/control valves (not shown).

Feed water with the aid of pump 68 and 69 passes through the HP and IP economizers 42 via conduit 70 and 71 and then to the final HP economizer 48 via conduit 72. At the same time, steam from the IP evaporator 46 leaves the HRSG 36 via conduit 74 to the closed circuit gas turbine cooling system as described further hereinbelow.

Meanwhile, condensate in the final HP economizer 48 is passed to the HP evaporator 50 via conduit 76. Steam exiting the HP evaporator 50 via conduit 78 through the superheater sections 52, 54 and 58, and is then returned to the HP section 22 of the steam turbine 20 by way of conduits 80 and 82.

Heat is provided to the HRSG 36 by the exhaust gases from the gas turbine 22, introduced into the RSG 36 via conduit 84, and which exit the HRSG 36 via a stack (not shown) via conduit 86. Optional fuel may be added to the HRSG 36 via conduit 88.

The normal supply of cooling steam is from the exhaust of the HP steam turbine via conduit 90 and the HRSG IP drum via conduit 74. The cooling steam from the HRSG IP drum 46 and the exhaust of the HP steam turbine 22 join in conduit 92 and is delivered to the gas turbine 14 through casing connections and to the gas turbine rotor through a conventional gland with labyrinth seals and appropriate leak-offs (not shown). Cooling steam heated by the gas turbine cooling duty is then conducted directly to the inlet of the IP steam turbine via conduits 94 and 96. In the preferred embodiment, this (now heated) cooling steam is mixed with steam from the reheater 56 via conduit 98 prior to admission to the IP section 24. A gland leak-off conduit 100 permits a very small amount of steam from the gas turbine rotor gland to be returned to the exhaust of the IP section 24 of the steam turbine 20.

It has been the practice to control steam temperature in the forward section 58 of the superheater 56 by a water spray introduced into an attemperator located downstream of the first pass 52 of the superheater in order to control the temperature of the steam.

It has been found, however, that the water spray input to the attemperator from, for example, the feedwater pump 68 (similar to the arrangement in FIG. 4 of parent application Ser. No. 08/161,070) can be problematical if the water contains impurities. As a result, it has been determined that steam purified in a steam drum would provide an attractive alternative to the conventional water spray.

Accordingly, the invention here utilizes steam from one end of the superheater, i.e., from a pass in the superheater section 52, to control (cool) the temperature of the superheated steam in section 58 at the opposite end. Thus, as shown, conduit 102 carries superheated steam from the first pass of superheater section 52 to the steam inlet of superheater 58, at or near the final pass, and ahead of the reheater 56. This attemperating steam is taken outside the HRSG so as not to be exposed to the gas turbine exhaust gas, under the control of valves 104 and 110. In other words, the superheated steam extracted via conduit 102 is cooler than the superheated steam in the forward section 58. As a result, the superheated steam entering section 58 is cooler, allowing a greater reduction in the gas turbine exhaust gas temperature by reason of enhanced absorption of heat into the superheated steam in section 58. This, in turn, provides temperature control of both the superheater and the reheater 56.

In steam systems operating at low enough pressure that drum steam can be throttled without entering the moisture (two phase) region, the attemperation steam may optionally be taken directly from the steam drum rather than the first superheater pass. This is shown as conduit 106 and valve 108, which in this instance would replace conduit 126 and valve 104.

It will be appreciated that steam taken from the superheater 52 via conduit 126 has been substantially purified in the drum of the high pressure evaporator 50, so that the contamination problem attendant conventional attemperators has been substantially eliminated.

Figure 2:
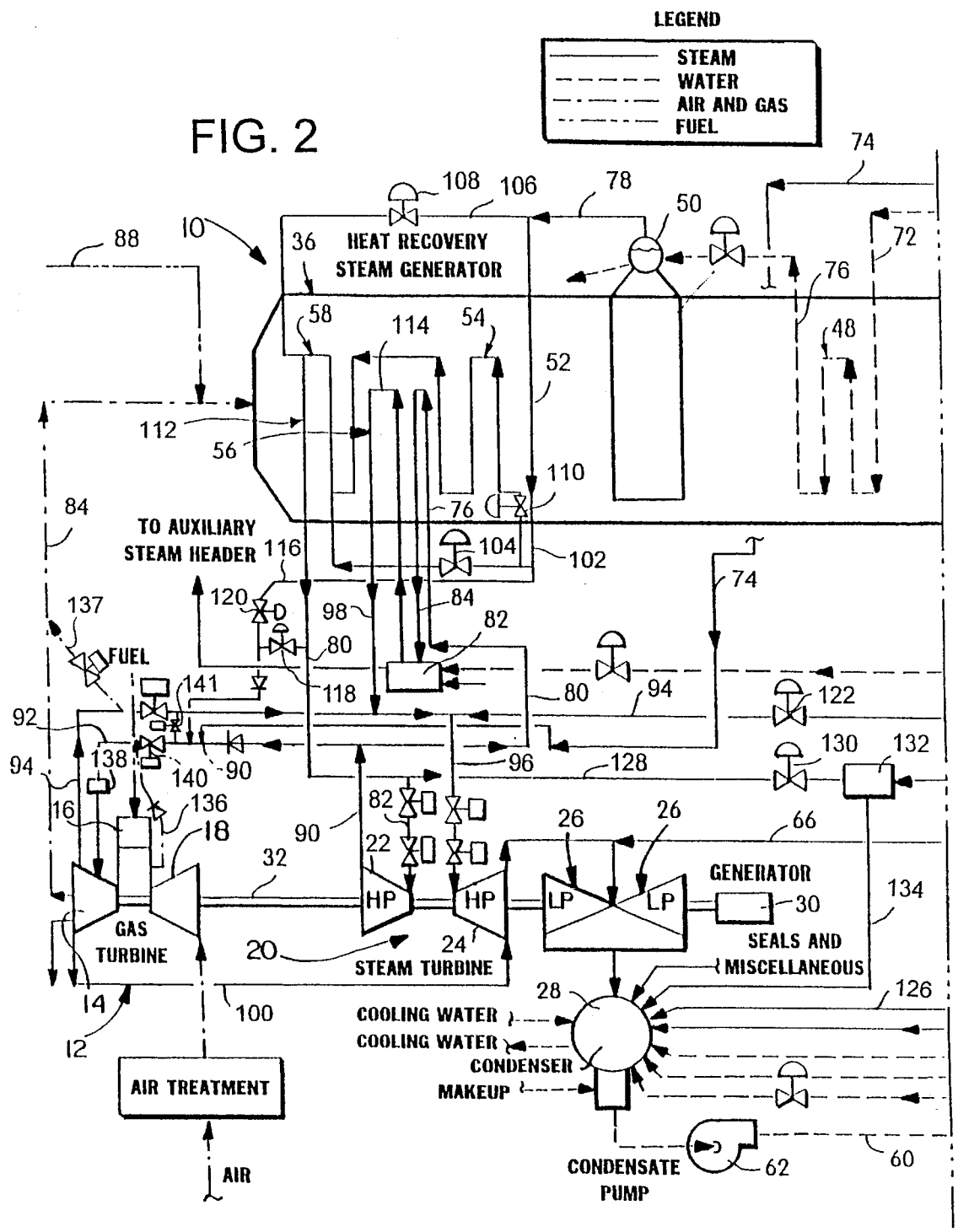
FIG. 2 is a schematic flow diagram similar to that illustrated in FIGS. 1A and 1B, but modified to show a start-up circuit.

Turning now to FIG. 2, a start-up steam supply circuit is illustrated wherein steam is extracted from the HP superheater 52 after the first pass via conduits 102 and 116 and mixes with steam from the superheater discharge conduit 80, temperature control valve 118 and flow control valve 120, to supply steam to the gas turbine cooling system via conduit 90 at the required temperature. Steam from the IP drum 46 (via conduit 74) is also utilized in the gas turbine cooling system as described hereinabove. A remaining portion of the HP steam from superheater section 58 may, on start-up, be directed via conduit 128 and bypass valve 130 to the attemperator 132 and then back to the condenser 28 via conduit 134.

When operating with the start-up steam supply, the return cooling steam is not admitted to the IP turbine 24. Rather, the return cooling steam in conduit 94 is bypassed to the condenser 28 through the IP bypass valve 122 and attemperator 124 and conduit 126. The IP bypass valve 122 is modulated to maintain the pressure of the cooling steam above the gas turbine compressor discharge pressure to prevent gas leakage into the steam cycle. A bypass 141 is also provided in the cooling steam circuit immediately upstream of the steam shut off valve 140. This bypass warms the steam lines and stabilizes the steam system during starting, prior to the admission of steam to the cooling system. In this regard, the cooling steam shut-off valves are hydraulically actuated and are included in the trip circuit such that the system is transferred to air cooling immediately upon a normal or emergency shut-down to purge steam from the cooling system.

During gas turbine start-up, and acceleration to rated speed and operation at low load, the gas turbine 12 is cooled by air extracted from the compressor discharge via conduit 136. The air is filtered at 138 prior to supply to the cooling system. This cooling air from the gas turbine is discharged to the gas turbine exhaust via conduit 137. Appropriate shut-off valves isolate the cooling system from the steam cycle while it is operating with air cooling.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a method of operating a combined cycle system including a gas turbine, a steam turbine and a multi-pressure heat recovery steam generator, wherein gas turbine exhaust is used in the heat recovery steam generator for reheating steam from the steam turbine, the improvement comprising supplying gas turbine cooling duty steam from a high pressure section of the steam turbine and from an intermediate pressure evaporator in the multi-pressure heat recovery steam generator, conducting the gas turbine cooling duty steam to the gas turbine for cooling hot gas turbine parts, and then returning the gas turbine cooling duty steam to an intermediate pressure section of the steam turbine.

2. The method of claim 1 wherein, early in start-up, prior to the availability of any cooling steam, the gas turbine hot stationary and rotating parts are cooled with filtered compressor discharge air.

3. The method of claim 1 wherein, during start-up, as start-up cooling steam is being established, the start-up cooling steam is bypassed around the intermediate pressure section of the steam turbine to warm the piping and valves.

4. The method of claim 1 wherein, during start-up, steam is extracted from a first pass of a high pressure superheater in the multi-pressure heat recovery steam generator, mixed with steam discharged from the high pressure superheater and then supplied to the gas turbine cooling duty system.

5. The method of claim 1 wherein, during staff-up, the gas turbine cooling duty steam is returned to a condenser, bypassing the intermediate pressure section of the steam turbine.

6. The method of claim 1 wherein the heat recovery steam generator includes a high pressure superheater and wherein the method includes controlling temperature in the high pressure superheater by:

a) extracting superheater steam from a first pass of the superheater;
   b) conducting the extracted steam outside the heat recovery steam generator; and
   c) reintroducing the extracted steam at the inlet of the final superheater, which occurs first in the gas path, ahead of all other HRSG heat transfer surfaces.

7. The method of claim 1 wherein the gas turbine cooling duty steam is mixed with steam from a reheater in the heat recovery steam generator upstream of the intermediate pressure section of the steam turbine.

8. In a combined cycle system including a gas turbine, a steam turbine and a multi-pressure heat recovery steam generator, the improvement comprising means for supplying gas turbine cooling duty steam from a high pressure section of the steam turbine and from an intermediate pressure evaporator in the multi-pressure heat recovery steam generator; means for conducting the gas turbine cooling duty steam to the gas turbine for cooling hot gas turbine pans; and means for returning the gas turbine cooling duty steam to an intermediate pressure section of the steam turbine.

9. The improvement of claim 8 wherein a start-up circuit is provided which includes means for extracting steam from a first pass of a high pressure superheater in the multi-pressure heat recovery steam generator; means for mixing the extracted steam with steam discharged from the high pressure superheater; and means for supplying the mixed steam to the gas turbine cooling system.

10. The improvement of claim 8 and including means for mixing the gas turbine cooling duty steam with steam from a reheater in the heat recovery steam generator before the gas turbine cooling duty steam is returned to the intermediate pressure section of the steam turbine.

11. The improvement of claim 9 wherein means are provided for returning gas turbine cooling duty steam to a condenser, bypassing the intermediate pressure section of the steam turbine.

12. The improvement of claim 8 wherein the heat recovery steam generator includes a multi-pass superheater and wherein means are provided for controlling temperature in the superheater by extracting steam from a first pass of the superheater, for conducting the extracted steam outside the heat recovery steam generator, and for reintroducing the extracted steam at the inlet end of the final superheater.

* * * * *